(12) United States Patent
Kim

(10) Patent No.: US 9,279,279 B1
(45) Date of Patent: Mar. 8, 2016

(54) HINGE APPARATUS FOR TRUNK LID

(71) Applicant: Hyundai Motor Company, Seoul (KR)

(72) Inventor: Han-Kyung Kim, Suwon-Shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/565,341

(22) Filed: Dec. 9, 2014

(30) Foreign Application Priority Data

Sep. 19, 2014 (KR) .......................... 10-2014-124988

(51) Int. Cl.
  E05F 1/08 (2006.01)
  E05D 13/00 (2006.01)
  E05D 11/00 (2006.01)
  B60J 5/10 (2006.01)

(52) U.S. Cl.
  CPC ............. *E05D 13/1207* (2013.01); *B60J 5/101* (2013.01); *E05D 11/0054* (2013.01); *E05D 2011/0072* (2013.01)

(58) Field of Classification Search
  CPC ................... E05Y 2900/548; E05Y 2900/546; E05Y 2900/531; E05Y 2201/416; E05D 2005/067; E05F 1/1276; E05F 1/1284; E05F 1/1292; E05F 1/1033; E05F 5/022
  USPC .......... 16/289, 286, 368, 366, 311, 369, 370, 16/287, 288, 277, 308, 306; 296/76, 296/146.11, 146.8
  See application file for complete search history.

(56) References Cited

U.S. PATENT DOCUMENTS

| 2,390,086 | A | * | 12/1945 | Ferris ............................. 49/206 |
| 2,964,781 | A | * | 12/1960 | Morin ............................ 16/321 |
| 4,776,626 | A | * | 10/1988 | Seyler ............................ 296/76 |
| 5,235,725 | A | * | 8/1993 | Rees ............................... 16/298 |
| 5,243,738 | A | * | 9/1993 | Kiefer ............................ 16/298 |
| 5,390,904 | A | * | 2/1995 | Rivard et al. .................. 267/204 |
| 7,350,845 | B1 | | 4/2008 | Duffy |
| 8,997,313 | B1 | * | 4/2015 | Krajenke et al. ................ 16/308 |
| 2005/0172453 | A1 | * | 8/2005 | Duffy ............................. 16/307 |
| 2006/0230578 | A1 | * | 10/2006 | Renke et al. .................... 16/289 |
| 2008/0016651 | A1 | * | 1/2008 | Marsh et al. .................... 16/361 |
| 2008/0084087 | A1 | * | 4/2008 | Duffy ............................. 296/76 |
| 2008/0098567 | A1 | * | 5/2008 | Duffy ............................. 16/306 |
| 2013/0318745 | A1 | * | 12/2013 | Krajenke et al. ................ 16/305 |

FOREIGN PATENT DOCUMENTS

| JP | 2007-524048 A | 8/2007 |
| KR | 10-1996-0029580 A | 8/1996 |
| KR | 20-1998-0037235 U | 9/1998 |

* cited by examiner

*Primary Examiner* — Chuck Mah

(74) *Attorney, Agent, or Firm* — Morgan, Lewis & Bockius LLP

(57) ABSTRACT

A hinge apparatus for a trunk lid may include a hinge arm which has a first end rotatably coupled to a vehicle body, and a second end fixed to the trunk lid, and a spring which may be mounted to and supported by the vehicle body, connected with the hinge arm, and elastically deformed by rotation of the hinge arm when the trunk lid may be closed, in which a position or a rotation angle at a point at which the spring may be supported by the vehicle body may be adjusted so that an amount of elastic deformation of the spring may be increased when the trunk lid may be closed.

5 Claims, 3 Drawing Sheets

HINGE APPARATUS FOR TRUNK LID

CROSS-REFERENCE TO RELATED APPLICATIONS

The present application claims priority to Korean Patent Application No. 10-2014-124988, filed on Sep. 19, 2014, the entire contents of which is incorporated herein for all purposes by this reference.

BACKGROUND OF THE INVENTION

1. Field of the Invention

The present invention relates to a hinge apparatus for a trunk lid, and more particularly, to a hinge apparatus for a trunk lid, which is configured to compensate for deterioration in opening force for the trunk lid even though the opening force deteriorates due to plastic deformation of a spring.

2. Description of Related Art

As illustrated in FIG. 1, a trunk room of a passenger vehicle is a space at a rear side of the vehicle for accommodating luggage, and a trunk lid 1 is rotatably mounted to a vehicle body, thereby opening and closing the trunk room.

A shape of a trunk lid 1 is variously designed in accordance with the type of vehicle and the shape classification, but a shape of the trunk lid 1 of a general sedan has a bent shape so as to shield an upper side and a rear side of the trunk room, and the trunk lid 1 is coupled to the vehicle body through a hinge apparatus so as to be opened and closed.

The hinge apparatus includes a hinge arm 2 which has one end rotatably coupled to the vehicle body, and the other end connected with the trunk lid 1, and a spring or a lifter which provides elastic force to the hinge arm 2.

The hinge arms 2 are disposed at both sides of the trunk lid 1, respectively, and rotatably mounted to brackets 4 fixed to the vehicle body. Further, a torsion spring or a gas lifter is additionally coupled to the hinge arm 2 so as to allow the trunk lid 1 to pop up to a predetermined height and assist force in lifting up the trunk lid 1 when the trunk lid 1 is opened.

When describing a structure in the related art in which the torsion spring 3 among others is coupled, in a state in which one end of the torsion spring 3 is supported by one side hinge bracket 5 rotatably coupled to the hinge arm 2, the other end of the torsion spring 3 is mounted to the other side hinge bracket 5 in a state in which the other end of the torsion spring 3 may be twisted at a predetermined angle.

That is, the torsion spring 3 is configured to be elastically twisted when the trunk lid 1 is closed, and to lift up the trunk lid 1 using elastic restoring force when the trunk lid 1 is unlocked.

However, there is a problem in that elastic restoring force of the torsion spring 3 deteriorates due to repetitive torsion as time passed, and plastic deformation of the torsion spring 3 occurs.

As an amount of plastic deformation of the torsion spring 3 is increased, elastic restoring force deteriorates, and as a result, a pop-up amount of the trunk lid 1 is decreased. Furthermore, when the pop-up amount is decreased, a sensor cannot sense an opening signal of the trunk lid 1, and a result, an indicating lamp for indicating an opened state of the trunk lid 1 is likely to be erroneously operated on an instrument panel.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hinge apparatus for a trunk lid which may compensate for deterioration in a pop-up amount due to plastic deformation, and allow a user to selectively set the hinge apparatus in accordance with the user's preference so that a pop-up amount is increased.

An aspect of the present invention provides a hinge apparatus for a trunk lid, including a hinge arm which may have one end rotatably coupled to a vehicle body, and the other end fixed to the trunk lid, and a spring which is mounted to and supported by the vehicle body, may have a protruding supporting portion connected with the hinge arm, and is elastically deformed by rotation of the hinge arm when the trunk lid is closed, in which a position or a rotation angle at a point at which the spring is supported by the vehicle body is adjusted so that an amount of elastic deformation of the spring is increased when the trunk lid is closed.

The spring according to the present invention may be a spiral spring which may have a diameter that is increased in accordance with an amount at which the spiral spring is wound, and a rotation angle at a point at which the spring is mounted to the vehicle body may be adjusted, such that an amount of elastic deformation may be increased.

The spring may be embedded between a cover and a housing and mounted to the vehicle body, the housing may be fixed to the vehicle body, a clip capable of being elastically deformed may be coupled to an inner circumferential surface of the housing, and the cover may be rotatably mounted to the housing while being operated in conjunction with the spring, and may have two or more protruding portions formed on an outer circumferential surface thereof so that the protruding portion is supported by the clip so as to prevent the cover from being inadvertently reversely rotated.

The protruding portion and the clip may be formed in a gear tooth shape, respectively, and an inclination angle of one side gear tooth-shaped surface may be formed to be relatively low, and an inclination angle of the other side gear tooth-shaped surface may be formed to be relatively high, so as to allow the spring and the cover to be rotated only in an intended direction.

A handle may be mounted to protrude on the cover.

The present invention described above may increase an amount of elastic deformation by adjusting a position of a point at which the spring is supported when the spring is elastically deformed, or by rearranging an angle of the spring, such that even though plastic deformation of the spring occurs, a pop-up amount of the trunk lid may be increased by compensating for the plastic deformation.

The spring of the present invention is a spiral spring, thereby easily compensating for a pop-up amount by changing a mounting angle, and the handle is mounted on the cover, which is rotated in conjunction with the spring, thereby allowing a user to more easily rotate the spring.

The cover may have a structure in which any one of the two or more protruding portions formed on the outer circumferential surface of the cover is supported by the clip mounted to the housing, and the protruding portion is formed in a serrated shape, thereby allowing the cover to be rotated only in a direction in which a pop-up amount of the trunk lid is increased.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
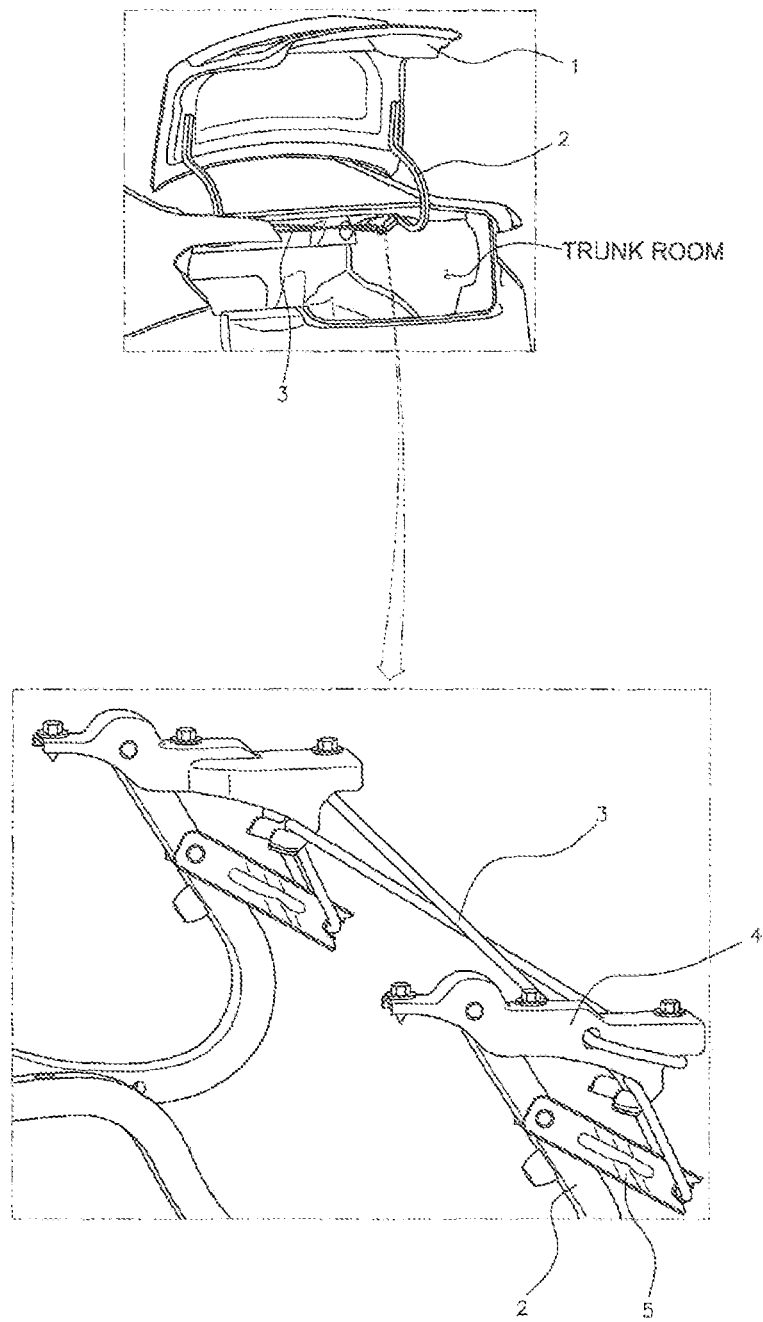
FIG. 1 is a view illustrating an appearance of a hinge apparatus for a trunk lid in the related art on which a torsion spring is mounted.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) may be intended to cover not only the exemplary embodiments, but also various alternatives, modifications, equivalents and other embodiments, which may be included within the spirit and scope of the invention as defined by the appended claims.

The present invention relates to a hinge apparatus for a trunk lid which includes: a hinge arm 10 which has one end that is rotatably coupled to a bracket 50 fixed to a vehicle body and the other end that is fixed to the trunk lid, and a spring 20 which is elastically deformed by rotation of the hinge arm 10, and a position or a rotation angle of a point at which the spring 20 according to an exemplary embodiment of the present invention is mounted may be adjusted so that an amount of elastic deformation may be increased when the trunk lid is closed.

Hereinafter, a hinge apparatus for a trunk lid according to an exemplary embodiment of the present invention will be described in more detail with reference to the drawings.

Figure 2:
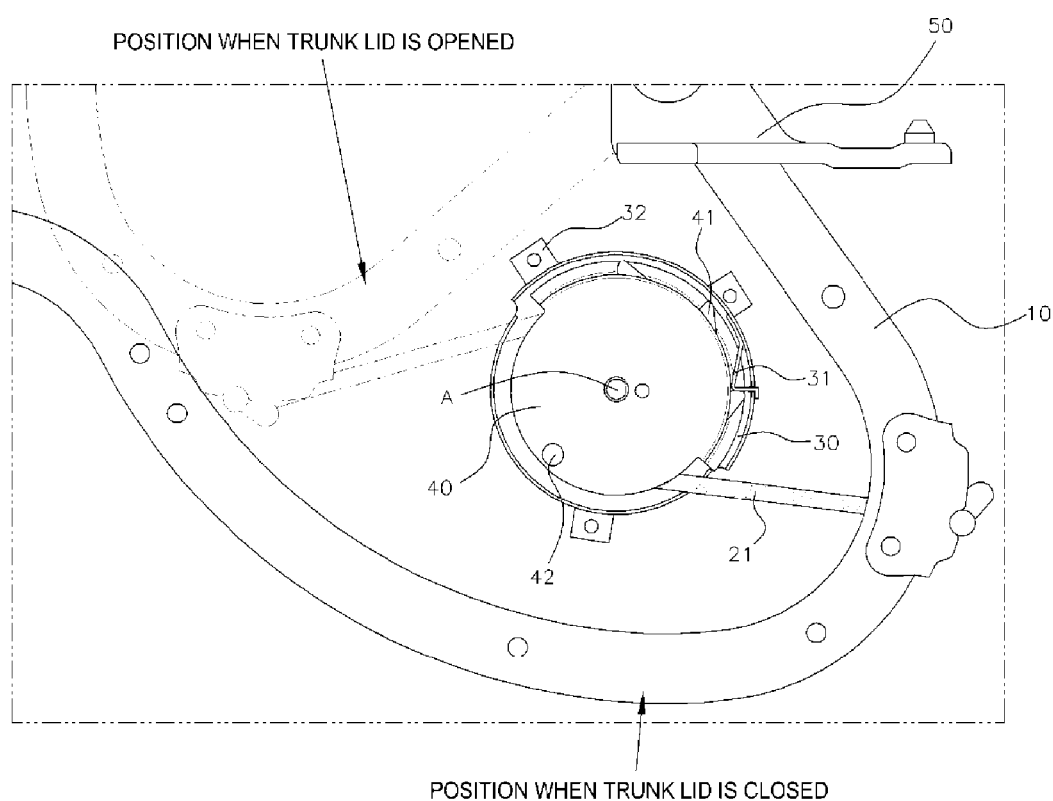
FIG. 2 is a view illustrating an appearance in which a hinge apparatus for a trunk lid according to an exemplary embodiment of the present invention is mounted.
Figure 3:
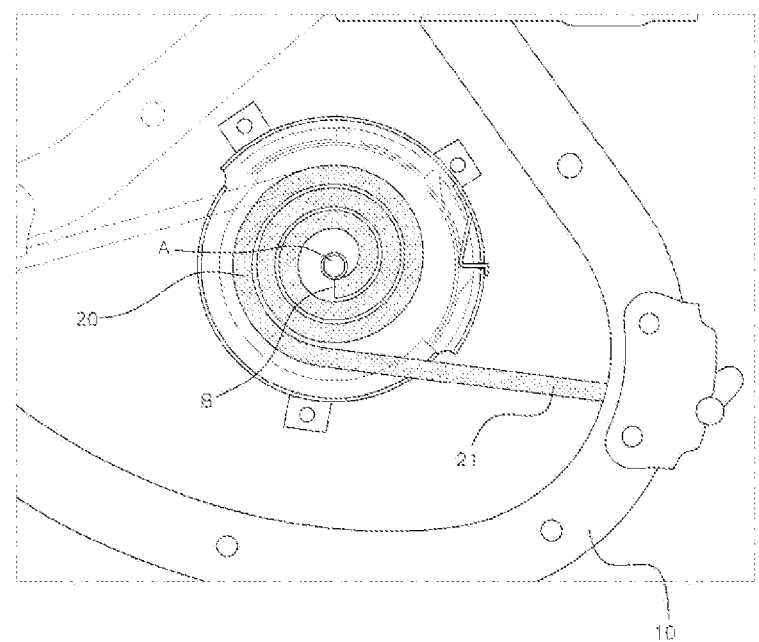
FIG. 3 is a view illustrating an appearance in which a spiral spring according to the exemplary embodiment of the present invention is mounted, by projecting a cover in FIG. 2.
Figure 4:
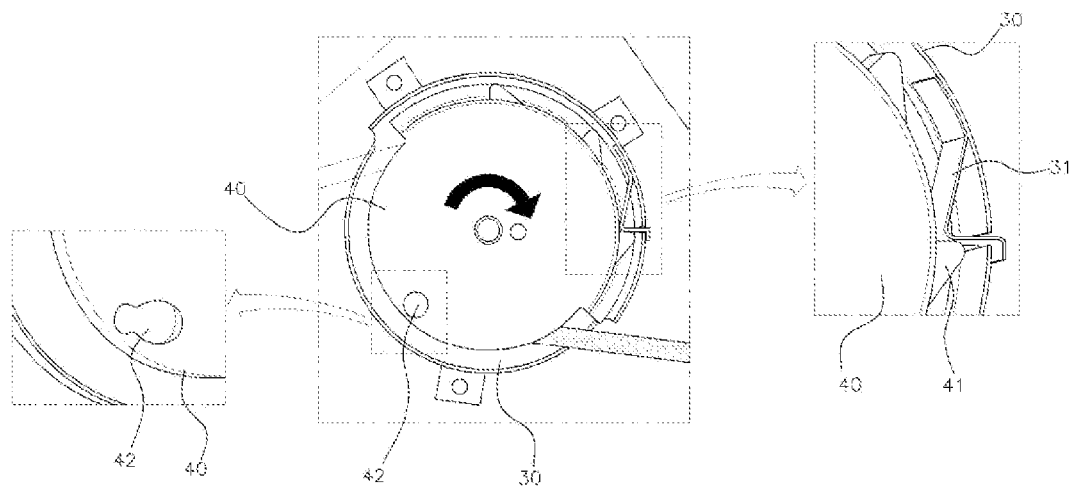
FIG. 4 is an enlarged view illustrating a portion where a protruding portion is supported by a clip, and a portion where a handle is formed.

Referring to FIGS. 2 to 4, the spring 20 according to the exemplary embodiment of the present invention is embedded between a cover 40 and a housing 30 and mounted to the vehicle body. A spiral spring, which has a diameter that is increased in accordance with an amount at which the spiral spring is wound, is used as the spring 20, and a supporting portion 21 protrudes at an outermost side of the spring 20 and is connected with the hinge arm 10. A rotation angle of a point fixed to the vehicle body or an end portion (B in FIG. 3), which is positioned at an innermost position and support elastic deformation, is adjusted so that an amount of elastic deformation may be increased.

The housing 30 has a structure which has a flange 32 formed on an outer circumferential surface thereof so as to be fixed to the vehicle body by bolting, riveting, or the like, and a clip 31, which is formed in a' z' shaped serrated gear tooth shape, is mounted on an inner circumferential surface at one side of the housing 30.

The spring 20 is fixedly coupled to the cover 40, the cover 40 is rotatably coupled together with the spring 20 on a central shaft A of the housing 30, and two or more protruding portions 41 are formed on an outer circumferential surface of the cover 40 so that the protruding portion 41 is supported by the clip 31 so as to prevent the rotation of the cover 40.

In the exemplary embodiment of the present invention, the protruding portion 41 is also formed in a gear tooth shape that is identical or similar to a protruding portion of the clip 31. That is, an inclination angle of one side gear tooth-shaped surface is formed to be relatively low, and an inclination angle of the other side gear tooth-shaped surface is formed to be relatively high.

Meanwhile, in order to support elastic deformation of the spring 20 and allow the spring 20 and the cover 40 to be rotated only in one direction (a direction in which a pop-up amount of the trunk lid is further increased), the clip 31 and the protruding portion 41 are disposed so that gear tooth-shaped surfaces (surfaces which are illustrated in the drawings so as to be inclined approximately at a right angle) of the clip 31 and the protruding portion 41, which are vertically formed, come into direct contact with each other, respectively, so as to support the rotation of the spring 20.

As illustrated in FIG. 4 in more detail, a gear tooth-shaped surface (a surface which is illustrated in the drawings so as to have a relatively low inclination) of the clip 31, which has a gentle inclination so that the cover 40 may be rotated clockwise, is disposed to face a gear tooth-shaped surface of a next protruding portion 41 which has a gradual inclination.

Therefore, the protruding portion 41 comes into direct contact with the clip 31 while the trunk lid in an opened state is closed (that is, while the spring 20 is elastically deformed counterclockwise in a state illustrated in FIG. 4), and the rotation of the spring 20 is restricted, such that the spring 20 of the present invention may be supported to generate elastic force.

The clip 31 is manufactured using a material that may be elastically deformed, and the gear tooth-shaped surfaces of the clip 31 and the protruding portion 41, which have a gentle inclination, respectively, face each other when the cover 40 is rotated clockwise (in a direction indicated by an arrow in FIG. 4), such that when a user rotates a handle 42 clockwise, a position and an angle at a point B at which the spring 20 is supported are moved (by an amount corresponding to a distance between neighboring protruding portions), and an amount of elastic deformation of the spring 20 is further increased when the trunk lid is closed.

According to an exemplary embodiment of the present invention having the aforementioned configuration, even though plastic deformation of the spring 20 occurs, a position of the supported portion may be adjusted by an amount that compensates for the plastic deformation, thereby inhibiting a pop-up amount of the trunk lid from deteriorating, and preventing an error of an indicating lamp due to the deterioration in pop-up amount when the trunk lid is opened.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hinge apparatus connecting a vehicle body and a trunk lid, comprising:
   a cover;
   a housing fixed to the vehicle body;
   a clip being elastically deformable and coupled to an inner circumferential surface of the housing;
   a hinge arm which has a first end rotatably coupled to the vehicle body, and a second end fixed to the trunk lid; and
   an elastic member which is mounted to and supported by the vehicle body, connected with the cover and the hinge arm, and elastically deformed by rotation of the hinge arm when the trunk lid is closed,
   wherein the elastic member is embedded between the cover and the housing and mounted to the vehicle body, and
   wherein the cover is rotatably mounted to the housing together with the elastic member and has protruding portions adapted to selectively engage with said clip.

2. The hinge apparatus of claim 1, wherein the elastic member is a spiral spring which has a diameter that is increased progressively from a center of the cover in accordance with an amount at which the spiral spring is wound.

3. The hinge apparatus of claim 1, wherein the protruding portions are formed on an outer circumferential surface of the cover so that at least one of the protruding portions is supported by the clip to prevent the cover from being inadvertently reversely rotated.

4. The hinge apparatus of claim 1, wherein each of the protruding portions and the clip are formed in a gear tooth shape, respectively, and an inclination angle of a first side gear tooth-shaped surface is formed to be relatively low, and an inclination angle of a second side gear tooth-shaped surface is formed to be relatively high, to allow the elastic member and the cover to be rotated only in an intended direction.

5. The hinge apparatus of claim 1, wherein a handle is mounted to protrude on the cover for adjusting the deformation of the elastic member.

* * * * *